United States Patent Office 3,328,448
Patented June 27, 1967

3,328,448
ORGANOSILANOLS AND METHOD OF
PREPARATION
Garrett H. Barnes, Jr., Allison Park, and Robert L. Merker, Pittsburgh, Pa., assignors to Dow Corning Corporation, Midland, Mich., a corporation of Michigan
No Drawing. Filed Mar. 29, 1962, Ser. No. 183,419
8 Claims. (Cl. 260—448.2)

This invention relates to a method of reacting SiH containing compounds with water to form the corresponding SiOH compounds.

The preparation of silanols by the hydrolysis of the corresponding chloro- or alkoxysilanes has long been known. This method works quite well for the preparation of the more stable silanols, but suffers from serious disadvantages with the more unstable silanols. This is true, because in general, the hydrolysis either produces acid by-products or requires an acid medium in order to allow the hydrolysis to proceed in a reasonable length of time. Such materials are catalysts for the condensation of silanols to siloxanes. Thus, it is difficult to prevent extensive condensation of the silanol groups to the corresponding siloxane.

This difficulty can be avoided by employing neutral conditions, such as, for example, by the hydrolysis of dimethyldiethoxysilane in distilled water to produce dimethylsilanediol. However, this procedure is quite slow and is not a commercially feasible method of preparing unstable silanols.

It is the object of this invention to provide a novel method of preparing silanols and siloxanols under conditions which do not cause extensive condensation of the silanol groups and under conditions where the reaction proceeds at a commercially feasible rate. Another object is to provide a feasible method for preparing highly unstable, highly hydroxylated siloxanols. Other objects and advantages will be apparent from the following description.

In accordance with this invention (1) an organosilicon compound containing at least one SiH group and having on the average at least one R group per silicon atom, in which R is attached to the silicon through a carbon atom, any remaining valences of the silicon atoms in said compound being satisfied by oxygen atoms of SiOSi linkages is reacted with (2) water in contact with (3) a catalyst selected from the group consisting of platinum, chloroplatinic acid, Zeise's salt, palladium, rhodium and ruthenium, whereby the SiH group is converted into SiOH.

The basic reaction involved in the process of this invention may be represented schematically by the equation: SiH+HOH→SiOH+H$_2$. Thus, it can be seen that there are no acidic or basic by-products to the reaction of this invention. The reaction proceeds spontaneously upon mixing the SiH compound, water and the catalyst and may proceed at room temperature. Often, however, it is advantageous to run the reaction below room temperature or to heat the reaction at elevated temperatures such as by carrying out the reaction at the reflux temperature of the solvent. The precise temperature employed must be governed to some extent by the silanol being prepared since obviously the temperature of the reaction should be below that at which extensive condensation of the silanol to the siloxane occurs. In general, the reaction should be carried out below 150° C.

Another factor influencing the temperature of the reaction is the pH of the system. If for any reason the system is acid or basic, a lower temperature is required to prevent extensive condensation of the silanol than if the reaction medium is essentially neutral. One way to guard against the accidental contamination of the reaction medium with acid or basic material or to neutralize any potential acid in the catalyst, is to employ a buffer solution which controls the pH at or near 7. If desired, the aqueous buffer solution may be employed to supply the water to the reaction. One suitable buffer solution is that prepared by mixing 0.65 g. of NaH$_2$PO$_4$·H$_2$O with 39.8 ml. of 0.1 N sodium hydroxide solution and diluting the mixture to one liter with water. Such a solution has a pH of 7.6.

It should be understood that the use of a buffered aqueous medium is not required but merely serves as insurance against the introduction of acid or basic material which would cause condensation of the silanol hydroxyls.

If desired, the reaction can be carried out in a solvent. Preferably the solvent should be one which is mutual to both the organosilicon compound and water. Suitable solvents include dioxane, the monomethylether of ethylene glycol, ethanol, isopropanol, or the like. It is preferred that the solvent be free of hydroxyl groups since if hydroxylated solvents are used there tends to be a competing reaction between the alcohol and the water with respect to the SiH group. In general, however, with the alcohols of the size of ethanol or above the reaction of the SiH with the water goes almost exclusively in preference to the reaction with the alcohol. It should be understood that the presence of a solvent is not essential for the reaction.

The SiH compound employed in this invention can be either a silane, a siloxane or a silcarbane. The compound can contain one silicon-bonded hydrogen per molecule or any number of silicon-bonded hydrogen atoms per molecule. Furthermore, the physical nature of the organosilicon reactant is not critical. The organosilicon compound can be, for example, silanes of the formulae RSiH$_3$, R$_2$SiH$_2$ and R$_3$SiH; siloxanes having the unit formula RHSiO or R$_2$HSiO$_{1/2}$ or RH$_2$SiO$_{1/2}$; or siloxane copolymers in which one or more of the silicon atoms has a silicon-bonded hydrogen attached thereto in which copolymers the various siloxane units can be, for example, of the formulae HSiO$_{1.5}$, H$_2$SiO, RHSiO, R$_2$HSiO$_{.5}$, SiO$_2$, RSiO$_{1.5}$, R$_2$SiO and R$_3$SiO$_{.5}$.

As stated above, the organosilicon compound can also be any silcarbane having at least one silicon-bonded hydrogen in the molecule. In these silcarbanes the various silicon atoms can be linked through the hydrocarbon halohydrocarbon, or hydrocarbon ether radicals defined below. It should be understood of course that the organosilicon compound can contain both SiOSi and silcarbane linkages in the molecule.

For the purpose of this invention R can be any hydrocarbon radical free of aliphatic unsaturation such as monovalent hydocarbon radicals such as alkyl radicals such as methyl, ethyl, isopropyl, t-butyl or octadecyl; cycloaliphatic hydrocarbon radicals such as the cyclopentyl, cyclohexyl, methylcyclohexyl or β-cyclohexylethyl; aryl hydrocarbon radicals such as phenyl, xenyl, naphthyl, anthracyl, tolyl or xylyl; and aralkyl hydrocarbon radicals such as benzyl, β-phenylethyl or β-phenylpropyl. In addition, R can be any monovalent halohydrocarbon radical such as chloromethyl, gamma-chloropropyl,

chlorocyclohexyl, bromophenyl, penta-chlorophenyl, α,α,α-trifluorotolyl, bromoxenyl and chloroanthracyl. R can also be any monovalent hydrocarbon ether radical in which there is no more than one oxygen per carbon atom such as gamma-methoxypropyl, gamma-phenoxypropyl, —(CH$_2$)$_3$OCH$_2$CH$_2$OMe,

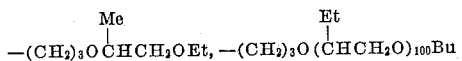

and —CH$_2$OCH$_2$CH$_3$.

R can also be any polyvalent hydrocarbon radical such as methylene, dimethylene, trimethylene, —(CH$_2$)$_{18}$—,

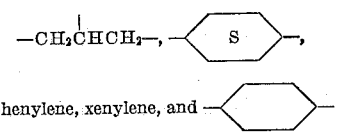

R can also be any polyvalenthalohydrocarbon radical such as

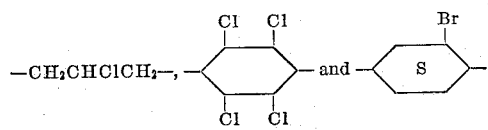

R can also be any polyvalent ether radical such as

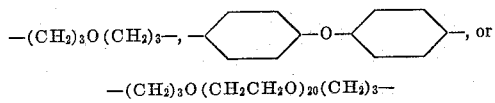

After the SiH has been reacted with the water to produce the silanol or siloxanol, the material can, if desired, be separated from the catalyst by any suitable means depending upon the physical state of the reaction product.

As has been noted, the method of this invention is suitable for preparing silanols from any organosilicon compound of the type defined containing at least one SiH group.

This invention further relates to silanols of the formula $$(R'_3SiO)_xSiOH\,\,R'_{3-x}$$

where $x$ is an integer from 2 to 3 inclusive and R' is monovalent hydrocarbon or monovalent halohydrocarbon radicals free of aliphatic unsaturation, and to cyclic siloxanols of the formula

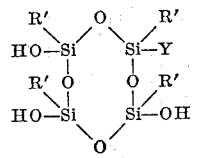

in which R' is as above defined and Y is selected from the group R' and OH.

Thus specific novel siloxanols which are within the scope of this invention are

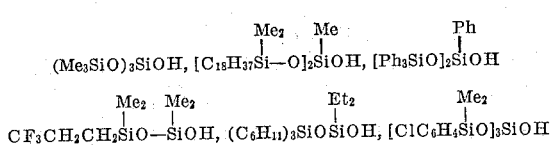

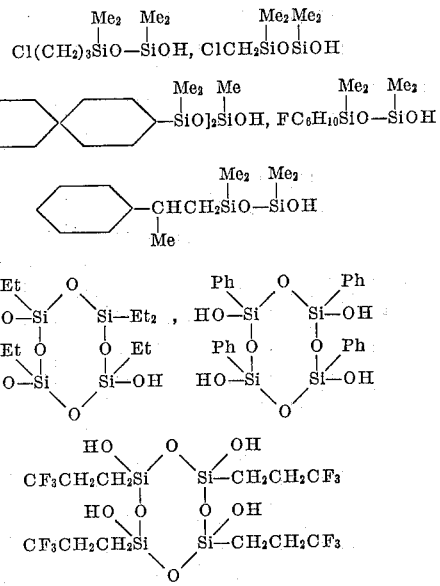

The catalyst employed in this invention can be chloroplatinic acid or Zeise's salt. The latter has the formula (K$^+$PtCl$_3$·CH$_2$=CH$_2$$^-$). The catalyst can also be the metals platinum, rhodium, ruthenium and palladium. For best performance the catalysts should be in a finely divided state. Effective metal catalysts are commercially available and they can, if desired, be deposited on inert carriers such as alumina or charcoal. The amount of catalyst is not critical although, in general, extremely small amounts causes the reaction to go at a satisfactory rate.

The SiH compounds which are employed as starting materials in the process of this invention, can be prepared by well known conventional methods.

The silanols which are produced in this invention are useful as water repellent agents and as intermediates in the preparation of siloxanes. They are particularly useful where one desires to produce specific siloxane structures by the co-condensation of two or more silanols.

In this application the following abbreviations are employed, Me is methyl, Et is ethyl, Bu is butyl and Ph is phenyl.

The following examples are illustrative only and should not be construed as limiting the invention which is properly delineated in the appending claims.

*Example 1*

3.7 g. of p-bis(dimethylhydrogensilyl)benzene was dissolved in 38 ml. of dioxane and to the mixture was added 7.7 ml. of a buffer solution [1] and .0016 g. of Zeise's salt (4.4×10$^{-6}$ g. of atom of platinum). The mixture was refluxed for 12.5 hours until no more gas was evolved and the test for SiH with alcoholic mercuric chloride was negative. The pH of the final mixture was 5. The mixture was neutralized with NaOH and evaporated to dryness. There was obtained the composition

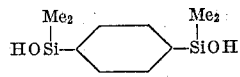

*Example 2*

The equivalent results were obtained with chloroplatinic acid employed in the place of Zeise's salt in the above reaction.

---

[1] The buffer solution is made by mixing 0.65 g. of NaH$_2$PO$_4$·H$_2$O and 39.8 ml. of .1 N sodium hydroxide and the mixture diluted to one liter with water. This solution was designed to maintain the reaction mixture in a pH range of between 7.6 and 6.8.

Example 3

9.7 g. of

was dissolved in 100 ml. of dioxane and there was added to the solution 20 ml. of the buffer solution of Example 1 and .237 g. of one percent platinum dispersed on charcoal ($1.2 \times 10^{-5}$ g. with platinum). The mixture was refluxed for 15 hours. The catalyst was removed by filtration and the mixture evaporated to dryness. Hot toluene was added to dissolve the organic portion of the residue and after filtering to remove inorganic salts p-bis(dimethylhydroxysilyl)benzene was obtained as a crystalline solid.

Example 4

.025 mols of

was dissolved in 50 ml. of dioxane, 10 ml. of the buffer solution of Example 1 and $2 \times 10^{-4}$ g. atom of rhodium in the form of a 5 percent by dispersion of rhodium on charcoal were mixed and allowed to stand at room temperature for 18 hours. The reaction mixture was filtered to remove the catalyst. The dioxane was evaporated and the residue crystallized from toluene to give the diol

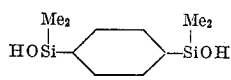

Example 5

.05 mol of sym-tetramethyldisiloxane was dissolved in 62 ml. of dioxane and 9 ml. of the buffer solution of Example 1 was added, then $2 \times 10^{-4}$ g. atom of ruthenium in the form of 5 percent by weight ruthenium dispersed on charcoal, was added and the mixture was allowed to react at room temperature for 4.5 hours. The product was filtered to remove the catalyst and the solvent was removed by evaporation in a stream of air at room temperature. The residue was a crystalline material which was recrystallized from hexane to give sym-tetramethyldisiloxanediol.

Example 6

0.25 mol of triphenylsilane was dissolved in 25 ml. of dioxane, 2.3 ml. of the buffer solution of Example 1 was added and $2 \times 10^{-4}$ g. atom of ruthenium dispersed on charcoal was added. The reaction mixture was heated at 85° to 88° C. for 23 hours. The reaction mixture was then filtered and the solvent evaporated in a stream of air giving a crystalline material which was triphenylsilanol.

Example 7

The procedure of Example 6 was repeated except that the catalyst employed was $1.9 \times 10^{-4}$ g. atoms of palladium dispersed on alumina. The dispersion contained 5 percent by weight palladium.

Example 8

.1 mol of phenyldimethylsilane was dissolved in 73 ml. of dioxane and 9 ml. of the buffer solution of Example 1 and $1.1 \times 10^{-4}$ g. atom of palladium was added in the form of palladium dispersed on alumina. The mixture was maintained at 30 to 35° C. for 11 hours. The catalyst was removed by filtration and the residue was fractionally distilled to obtain phenyldimethylsilanol.

Example 9

0.075 mol of methyldiphenylsilane was dissolved in 64 ml. of dioxane and 6.5 ml. of the buffer solution of Example 1 and $1.5 \times 10^{-4}$ g. atom of ruthenium in the form of ruthenium dispersed on charcoal was added. The mixture was heated at 88° C. for 23 hours. The catalyst was removed by filtration and the product fractionally distilled to give methyldiphenylsilanol.

Example 10

0.15 mol of triethylsilane was dissolved in 125 ml. dioxane and 13.5 ml. of the buffer solution of Example 1 and $3 \times 10^{-4}$ g. atom of ruthenium in the form of ruthenium dispersed on charcoal was added. The mixture was heated at 57 to 90° C. for 6 hours, filtered to remove the catalyst and then fractionally distilled to give triethylsilanol.

Example 11

A solution of 6 g. of $(MeHSiO)_4$, 58 ml. of dioxane and 9 ml. of the buffer solution of Example 1 were stirred and cooled on a water bath. To this was added .4 g. of a dispersion of palladium on charcoal containing 4 percent by weight palladium. Gas evolution began immediately after the addition of the catalyst and reaction continued for 7 hours at 25 to 30° C., the reaction mixture was filtered and the volatile solvents were removed by evaporation. There was obtained a hard crystalline solid which was shown by analysis to be the cyclic compound

This cyclic material was soluble in water to the extent of 22 percent by weight based on the weight of the solution.

Example 12

16.2 g. of $EtMe_2SiOSiMe_2H$ was dissolved in 100 ml. of dioxane and 9 ml. of the buffer solution of Example 1 was added. The catalyst in the form of 4 percent by weight palladium dispersed on charcoal was added in two .1 g. increments in order to maintain the rate of gas evolution at a reasonable figure and to keep the reaction mixture in the temperature range of 25 to 32° C. The reaction went to completion in 3 hours. The mixture was filtered and the aqueous solvent removed at room temperature under reduced pressure. Fractional distillation gave the siloxanol $EtMe_2SiOMe_2SiOH$.

Example 13

22.2 g. of

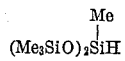

was dissolved in 105 ml. of dioxane and 9 ml. of the buffer solution of Example 1 was added. The mixture was stirred and cooled as .3 g. of a dispersion of palladium on charcoal containing 4 percent palladium was added in three .1 g. increments. The reaction was complete in 3 hours. The product was filtered and the solvent removed by evaporation and the residue was fractionally distilled to give the siloxanol

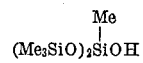

Example 14

When the following organosilicon compounds are reacted with water in amount of 10 mols of water per mol of SiH in the organosilicon compound in a solvent comprising the dimethylether of ethylene glycol and in contact with palladium dispersed on charcoal, the following products are obtained:

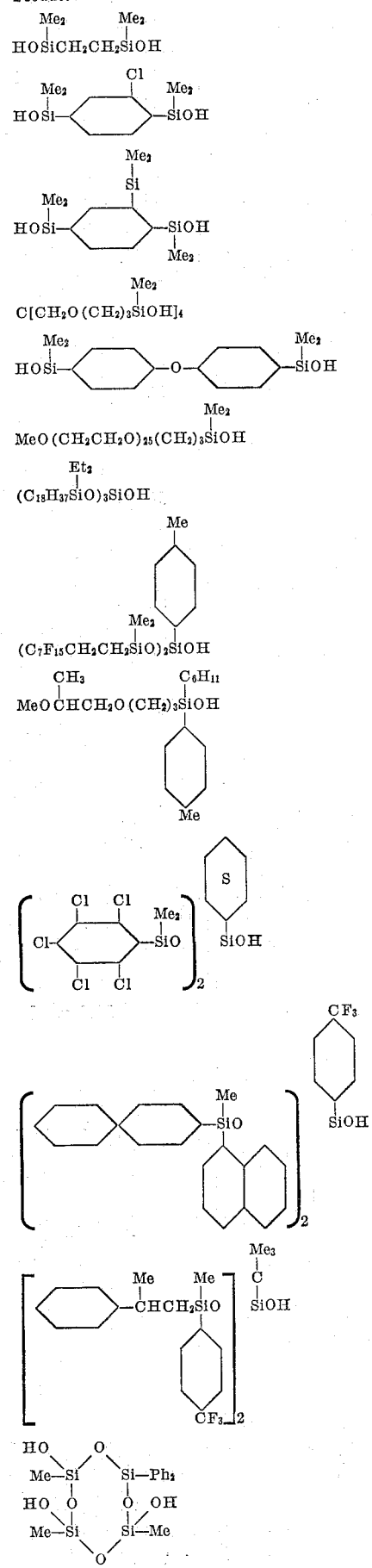

| Organosilicon compound | Product |
|---|---|
| Copolymer of<br>20 mol % PhMeSiO<br>40 mol % PhSiO$_{3/2}$<br>25 mol % MeSiO$_{3/2}$<br>15 mol % MeHSiO | Copolymer of<br>20 mol % PhMeSiO<br>40 mol % PhSiO$_{3/2}$<br>25 mol % MeSiO$_{3/2}$<br>15 mol % Me$\overset{\text{OH}}{\underset{\mid}{\text{Si}}}$O |
| Copolymer of<br>50 mol % PhSiO$_{3/2}$<br>49 mol % Me$_2$SiO<br>1 mol % HSiO$_{3/2}$ | Copolymer of<br>50 mol % PhSiO$_{3/2}$<br>49 mol % Me$_2$SiO<br>1 mol % HOSiO$_{3/2}$ |
| 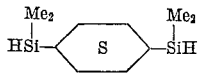 | 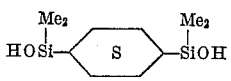 |
| 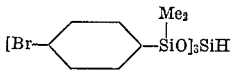 | 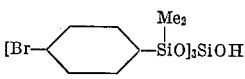 |
| 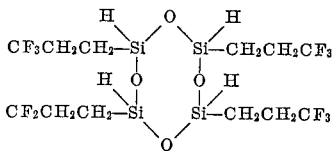 | 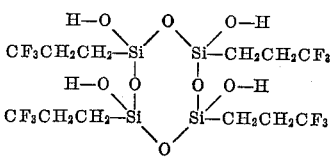 |
| (Me$_3$SiO)$_3$SiH | (Me$_3$SiO)$_3$SiOH |

That which is claimed is:

1. A method of preparing organosilicon compounds having at least one SiOH group which comprises reacting
   (1) an organosilicon compound containing at least one SiH group and having on the average of at least one R group per silicon atom in which R is attached to the silicon through a carbon atom and any remaining valences of the silicon atoms in said compound being satisfied by oxygen atoms of SiOSi linkages, R being free of aliphatic unsaturation and being selected from the group consisting of hydrocarbon radicals, halohydrocarbon radicals, and hydrocarbon ether radicals, there being no more than one ether linkage per carbon atom with
   (2) water in contact with
   (3) a catalyst selected from the group consisting of chloroplatinic acid, Zeise's salt, palladium, rhodium and ruthenium, whereby the SiH is converted into SiOH.

2. The method in accordance with claim 1 wherein the catalyst is palladium.

3. A siloxanol of the formula

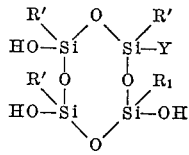

in which R' is selected from the group consisting of monovalent hydrocarbon radicals, and monovalent halohydrocarbon radicals, and Y is selected from the group consisting of R' and OH radicals.

4. The cyclic composition of the formula

where Me is methyl.

5. The cyclic composition of the formula

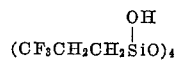

6. The cyclic composition of the formula

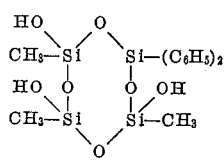

7. A siloxanol of the general formula

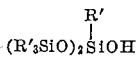

in which R' is selected from the group consisting of monovalent hydrocarbon radicals and monovalent halohydrocarbon radicals.

8. A compound of the formula

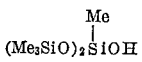

where Me is methyl.

References Cited

UNITED STATES PATENTS

| 2,030,738 | 2/1936 | Bley | 260—448.2 |
| 2,967,170 | 1/1961 | Merker | 260—448.2 |
| 2,967,171 | 1/1961 | Barnes | 260—448.2 |

FOREIGN PATENTS

| 16,354 | 10/1955 | Germany. |

OTHER REFERENCES

Chugunov I, "Izvestia Akad. Nauk. SSSR," 1956, pp. 1059–61 (51 Chem. Abstr. 4980).

Chugunov II, ibid., 1957, pp. 1368–70 (52 Chem. Abstr. 7189–90).

Chugunov III, "Zhur. Obshcheii Khim," vol. 27 (1957), pp. 494–6 (51 Chem. Abstr. 15,441).

Feher et al. (I), ibid., vol. 92 (1959), p. 2,998 et seq.

Feher et al. (II), ibid., vol. 94 (Sept. 22, 1961), pp. 2437–41.

Kautsky et al., "Zeitschrift fur Naturforschung," vol. 11B, 1956, pp. 301–2.

Kohama, "Chem. Abstract," vol. 56 (1962), col. 3,505–6.

Meads et al., "Jour. Chem. Soc." (London), vol. 105 (1914), pp. 679–90.

Muller et al., "Jour. Prakt. Chemie," vol. 9, 1959, pp. 63–70.

Stock et al., "Berichte der Deutschen Chemischen Gesellschaft," vol. 52, 1919, pp. 695–724, pp. 696 and 708 only needed.

TOBIAS E. LEVOW, *Primary Examiner.*

SAMUEL H. BLECH, J. G. LEVITT, P. F. SHAVER, *Assistant Examiners.*